(12) United States Patent
Chu et al.

(10) Patent No.: US 6,556,622 B1
(45) Date of Patent: Apr. 29, 2003

(54) SEAMLESS TRANSITION BETWEEN COMMUNICATION CHARACTERISTICS OF COMMUNICATION DEVICES

(75) Inventors: Keith T. Chu, Laguna Niguel, CA (US); Frank B. Hansen, Lake Forest, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/339,353

(22) Filed: Jun. 23, 1999

(51) Int. Cl.$^7$ .............................. H04B 1/38; H04L 5/16
(52) U.S. Cl. ...................... 375/222; 375/219; 375/220; 375/221
(58) Field of Search ................................ 375/222, 220, 375/221, 219; 370/278, 282, 496, 426, 438, 439; 709/227, 237

(56) References Cited

U.S. PATENT DOCUMENTS 6,178,330 B1 * 1/2001 Alberty et al. .............. 455/452
6,330,597 B2 * 12/2001 Collin et al. ................ 709/220

* cited by examiner

Primary Examiner—Mohammad H. Ghayour
(74) Attorney, Agent, or Firm—Akin Gump Strauss Bauer and Feld, LLP

(57) ABSTRACT

A communication system that includes a first modem and a second modem that establishes a communication link between the first modem and the second modem. The communication link has a first set of communication characteristics including a first communication channel or group of communication channels through which at least data is exchanged and a second communication channel through which no data is exchanged. Either the first modem or the second modem is configured to signal for a change, via the second communication channel, in the first set of communication characteristics.

18 Claims, 9 Drawing Sheets

SEAMLESS TRANSITION BETWEEN COMMUNICATION CHARACTERISTICS OF COMMUNICATION DEVICES

BACKGROUND

1. Field of the Invention

The present invention relates to communication systems, in particular to a system that provides the capability to alter communication characteristics of a communication link between modems in a telecommunication system.

2. Description of the Related Art

A typical telecommunication system operates with at least two modems that communicate across a communication link that is established through a telephone network. The communication link has communication characteristics that are established when one modem begins to communicate with another modem across the communication link. These communication characteristics typically include one or more communication channels for exchanging data across the communication link and a second communication channel through which no data is exchanged but a "guard tone" is included that prevents communication signals from undesirably interfering with each other.

In a modem day Public Switched Telephone Network (PSTN), the transport of a modem signal is digital and does not exhibit the same range of impairments as an older analog/FDM switch network. For example, the presence of noise, phase jitter, frequency offset and gain hits are significantly reduced in the digital PSTN. V.34 was developed in consideration of the improved GSTN infrastructure and relies upon PSTN to achieve the high data rates that are supported. However, V.34 half-duplex (V.34HDX) has some performance limitations if it is connected over the older analog/FDM switch network. For example, in the case of facsimile transmissions, the reliability of the passing facsimile images could be impaired if V.34HDX operates across an older analog/FDM switch network.

Many other problems and disadvantages of the prior art will become apparent to one skilled in the art after comparing such prior art with the present invention as described herein.

SUMMARY OF THE INVENTION

Various aspects of the present invention may be realized through a communication system that includes a first modem and a second modem that establishes a communication link between the first modem and the second modem. The communication link has a first set of communication characteristics including a first communication channel or group of communication channels through which at least data is exchanged and a second communication channel through which no data is exchanged. Either the first modem or the second modem is configured to signal for a change, via the second communication channel, in the first set of communication characteristics.

The first modem of the communication system is often configured to signal for a change in the first set of communication characteristics via the second communication channel and the second modem is often configured to dismiss the signal from the first modem on the second communication channel. In this embodiment, the first modem is typically configured to recognize that the signal on the second communication channel has been dismissed by the second modem and the first modem refrains from further signaling to the second modem via the second communication channel. In another embodiment, the first modem is configured to signal for a change in the first set of communication characteristics via the second communication channel and the second modem is configured to recognize and respond to the signal. The first modem commonly includes transition processing circuitry that monitors the first set of communication characteristics between the first and second modems, that indicates when communications via the communication link may be improved by shifting to a second set of communication characteristics on the communication link, and that enables a shift in the communication link to the second set of communication characteristics. The second set of communication characteristics may include at least a reduced data transmission rate, at least an increased data transmission rate, or even at least a data transmission rate that is similar to a data transmission rate of the first set of communication characteristics.

Various aspects of the present invention may also be realized in a method for a communication system having a communication link between a first communication device and a second communication device to inquire whether a first set of communication characteristics in the communication link may be modified. In one embodiment, the method comprises establishing at least first and second communication channels across the communication link, the first communication channel exchanging at least data according to the first set of communication characteristics, the second communication channel exchanging no data. The method also includes inquiring, by the first communication device across the second communication channel, whether the second communication device recognizes communications across the second communication channel.

Inquiring whether the second communication device recognizes communications across the second communication channel often comprises passing communication signals across the second communication channel in such manner that the communication signals do not interfere with communications on the first communication channel. The method may also comprise determining, by the first communication device, that communication signals are not recognized across the second communication channel by the second communication device. In addition, the method may also comprise discontinuing further inquiries across the second communication channel from the first communication device. On the other hand, the second communication device may acknowledge, across the second communication channel, that communication signals are recognized across the second communication channel. In this aspect, the method often comprises monitoring the first communication channel to analyze whether the first set of communication characteristics of the first communication channel should be modified.

In some embodiments, the method further comprises determining that the first set of communication characteristics of the first communication channel should be modified and a new set of communication characteristics should be established. Either the first or second communication device indicates, across the second communication channel, that the first set of communication characteristics should be replaced with the new set of communication characteristics, and the first set of communication characteristics are replaced with the new set of communication characteristics without interfering with communications between the first and second communication devices.

Various aspects of the present invention may also be found in a communication system comprising a source communication device, a destination communication device, and a communication link having a first set of communication characteristics for electronic communications between the source communication device and the destination communication device. The source communication device includes circuitry that generates a request signal to establish at least one communication channel with the destination communication device across the communication link. The destination communication device includes circuitry that receives and acknowledges the request signal from the source communication device and that completes establishment of the at least one communication channel. The destination communication device also includes an indicator that indicates to the source communication device that the first set of communication characteristics in the communication link should be modified and a second set of communication characteristics should be established.

In certain embodiments, the indicator of the destination communication device comprises circuitry that generates an indication signal that is transparent to data communications across the communication link. Further, the source communication device may include additional circuitry that acknowledges receipt of an indication signal from the destination communication device, the indication signal being received across a second communication channel that does not pass data between the source and destination communication devices. The indicator of the destination communication device may include circuitry that amplitude modulates a guard tone with a second frequency and depth that is dependent upon requirements of the first set of communication characteristics on the communication link. In addition, the indicator of the destination communication device may indicate to the source communication device that data communications across the communications link that utilize the first set of communication characteristics could be improved by shifting to a second set of communication characteristics.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

DETAILED DESCRIPTION OF THE DRAWINGS

Figure 1:
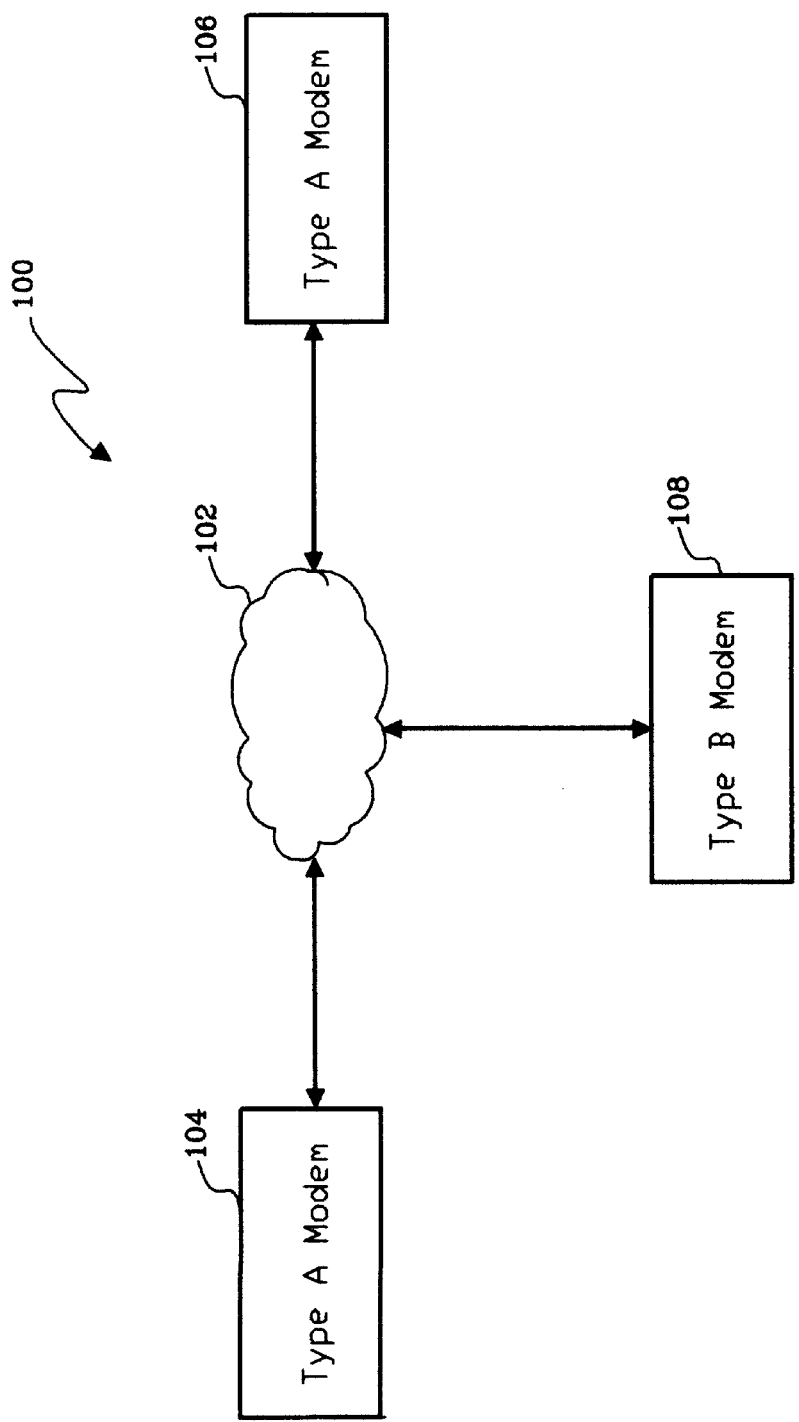
FIG. 1 is a block diagram of an exemplary communication system wherein different type modems are illustrated as being connected to a telephone network.

FIG. 1 is a block diagram of an exemplary communication system 100 wherein different type modems are illustrated as being connected to a telephone network 102. Modems 104, 106 include circuitry that allows the two modems 104, 106 to communicate across the telephone network 102 via a communication link having communication characteristics that include at least two communication channels, one communication channel or group of communication channels for exchanging data and another communication channel in which no data is exchanged. The modems 104 and 106, for ease of reference, are labeled "type A modems".

The type A modems 104, 106 each include circuitry that allows the modems to establish a communication link across the telephone network 102, the communication link having particular communication characteristics. The circuitry also allows each of the modems 104, 106 to determine whether they are communicating with another type A modem. In one embodiment, if the modem 104 determines that it is communicating with another type A modem, e.g., modem 106, the modem 104 monitors the communication link. If the modem 104 determines that the communication characteristics may be improved across the communication link, the modem 104 indicates to the modem 106 that the communication characteristics will be changed. For example, if the modems 104, 106 communicate utilizing V.34 and the modem 104 determines that the line conditions are too poor for V.34 operation, then the modem 104 signals the modem 106 that the communication characteristics across the communication link should be modified and the modems 104 and 106 transition to new communication characteristics.

The transition occurs in a way that is transparent to the data communications on the communication link and does not interfere or cause disruption in data communications. The transition is transparent because the modems 104 and 106 communicate the transition signals across a communication channel that is not used to exchange data. In one embodiment, the transition signals are created when a guard tone is amplitude modulated with a second frequency at an appropriate depth of modulation. Typically, the guard tone prevents the network echo cancellors and suppressors from switching back in to the data channels, however, in this embodiment, the carrier for the transition signals is the same frequency as the guard tone and the modulation frequency and depth is dependent upon the channel requirements. This signal is sometimes referred to as "GTam". This produces a signal with sidebands, which are distinct but are close enough to the carrier as not to cause a problem with interference with the communication channel.

With the configuration of a communication link between the two type A modems 104, 106, the communication characteristics can be altered to produce the most ideal communication characteristics between the modems 104, 106. For example, the modems 104, 106 could "fall back" to more primitive communication characteristics because the communication link is across an outdated telephone system 102, the modems 104, 106 could "fall forward" to more recently developed communication characteristics that are supported on a modern telephone system 102, or the modems 104, 106 could just "shift" to different communication characteristics that would not be considered falling forward or backward but, nonetheless, improve communications. In addition, either the modem 104 or the modem 106 could initiate the change in communication characteristics via the non-data communication channel. The change could be based on multiple factors, one of such factors being to maximize data throughput.

In another configuration, a communication link is established across the telephone network 102 between the modem 104 and a modem 108. The modem 108 is labeled "type B" modem to distinguish it from the type A modems 104, 106. The modem 108 does not include circuitry that enables transitions between different sets of communication characteristics. In fact, the modem 108 does not include circuitry that recognizes transition communications on a non-data exchanging communication channel. The circuitry of the modem 104 allows a communication link to be established with the modem 108 and, in one embodiment, the modem 104 discontinues transition signaling to the modem 108 across the non-data communication channel once it is determined that the modem 108 does not recognize communications on the non-data communication channel. In other words, the circuitry of the modem 104 is such that the modem 108 is not affected by the initial transition signaling of the modem 104. However, it should be noted that the modem 108 could recognize other non-data exchanges on the non-data communication channel.

Figure 2:
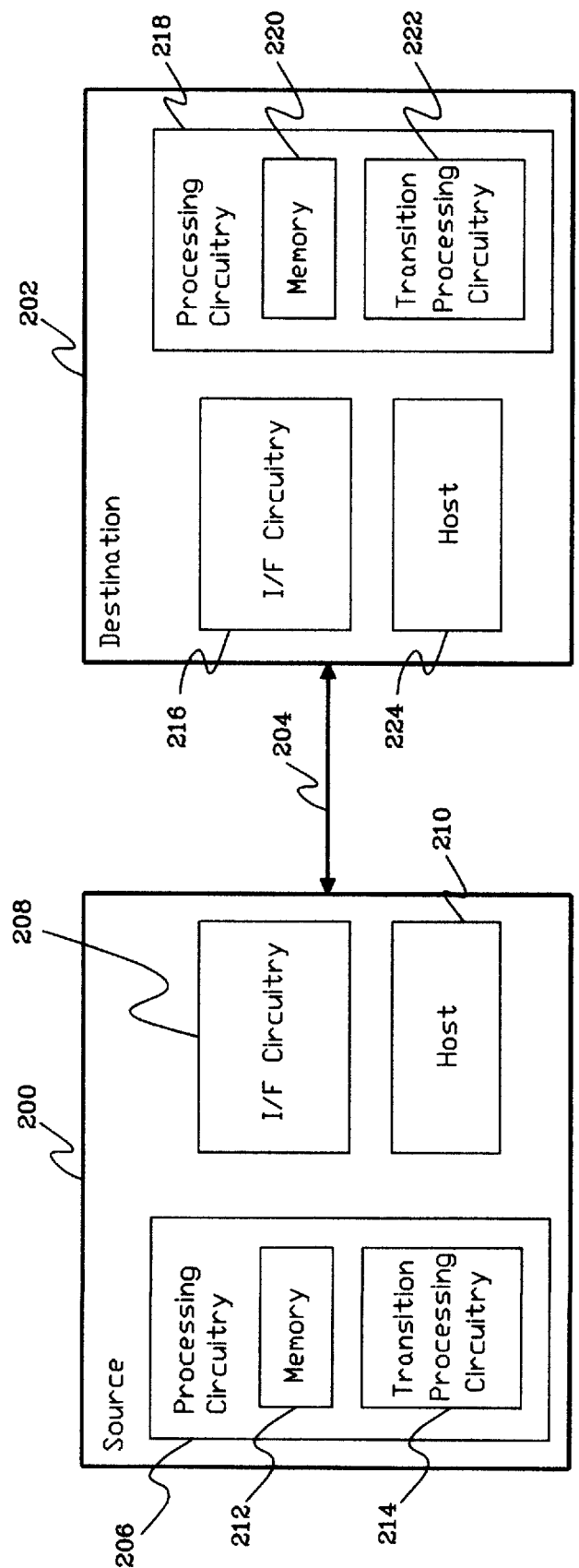
FIG. 2 is a block diagram of exemplary source and destination communication devices that have established a communication link therebetween for communications across the communication link according to principles of the present invention.

FIG. 2 is a block diagram of exemplary source and destination communication devices 200, 202 that have established a communication link 204 therebetween for communications across the communication link 204 according to principles of the present invention. The source communication device 200 includes processing circuitry 206 and interface circuitry 208. In some embodiments the source communication device 200 also includes a host computer 210. The processing circuitry 206 includes a memory 212 and transition processing circuitry 214.

The processing circuitry 206 enables the source communication device 200 to initiate communications on the communication link 204 and establish a first set of communication characteristics between the source and destination communication devices 200, 202. In this case, the destination communication device 202 includes the same type of circuitry as the source communication device 200 and the communication link supports at least one data exchanging communication channel and at least one non-data exchanging communication channel. These channels have particular communication characteristics according to the circuitry of the source and destination communication devices 200, 202, the type of communication link 204 that is established, e.g., the communication link 204 could be across a General Switched Telephone Network (GSTN), an older analog/FDM switch, or even a system with other communication parameters.

In one embodiment, the source communication device 200 initiates the communication link 204 with the destination communication device 202. The destination communication device 202 includes interface circuitry 216 that interfaces with the communication link 204 and processing circuitry 218 that has a memory 220 and transition processing circuitry 222. The processing circuitry 218 determines that the source communication device 200 recognizes communications on the non-data communication channel and includes transition processing circuitry 214 for changing communication characteristics on the communication link 204. The processing circuitry 218 then monitors the communication link 204 to determine whether the current communication characteristics of the communication link 204 are satisfactory, and if so, continues to monitor the communication link 204.

The processing circuitry 218 can also test and compare the existing communication characteristics against other communication characteristics to determine if a change in communication characteristics would be desirable. The testing and comparing occurs in the processing circuitry 218 or sometimes through processing on a host 224 or even on the host 210.

Figure 3:
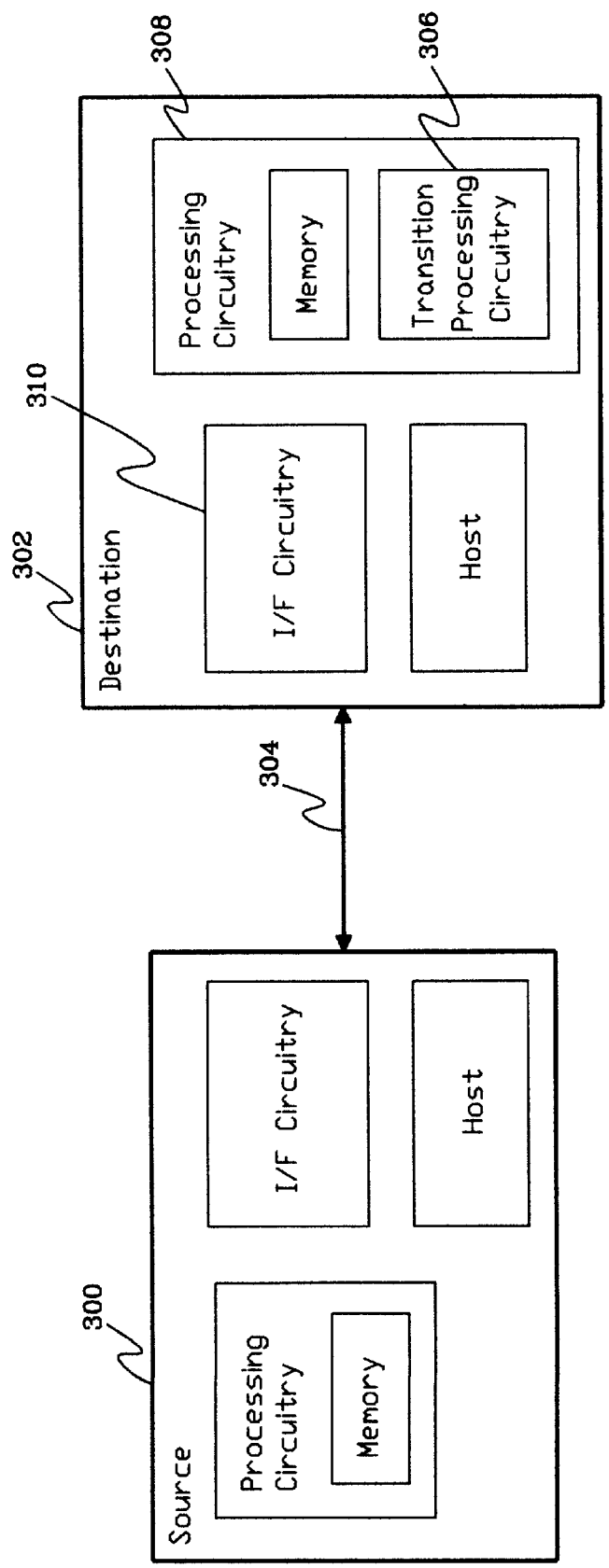
FIG. 3 is a block diagram of exemplary source and destination communication devices that have established a communication link therebetween for communications across the communication link, wherein the source communication device does not include transition processing circuitry.

FIG. 3 is a block diagram of exemplary source and destination communication devices 300, 302 that have established a communication link 304 therebetween for communications across the communication link 304, wherein the source communication device 300 does not include transition processing circuitry. The destination communication device 302 is configured similar to the destination communication device 202 and includes transition processing circuitry 306 and accompanying processing circuitry 308 and interface circuitry 310. Like the communication devices 200 and 202, the source communication device 300 may initiate communications with the destination communication device 302 across the communication link 304.

In the example of FIG. 3, upon initiation of communications, the destination device 302 does not know if the source communication device 300 is configured to transition between different communication characteristics. Thus, the destination communication device 302 inquires across the communication link 304 whether the source communication device 300 is configured to transition between communication characteristics. This inquiry is done in such a manner that communications from the source communication device 300 are not adversely affected—even though the source communication device 300 has no transition circuitry. In one embodiment, when the destination communication device 302 receives no response from the source communication device 300, the destination communication device 302 determines that monitoring the communication link 304 would be wasting resources because no change in communication characteristics could occur with the source communication device 300, and the destination communication device 302 does not monitor the communication link 304.

Of course, the destination communication device 302 could be configured to monitor the communication link 304 without first inquiring of the source communication device 300. However, in this case, if the destination communication device 302 determines that a change in communication characteristics would be desirable, the communication device 302 requires circuitry that allows a request to change communication characteristics to occur without interfering with existing communications on the communication link 304.

Figure 4:
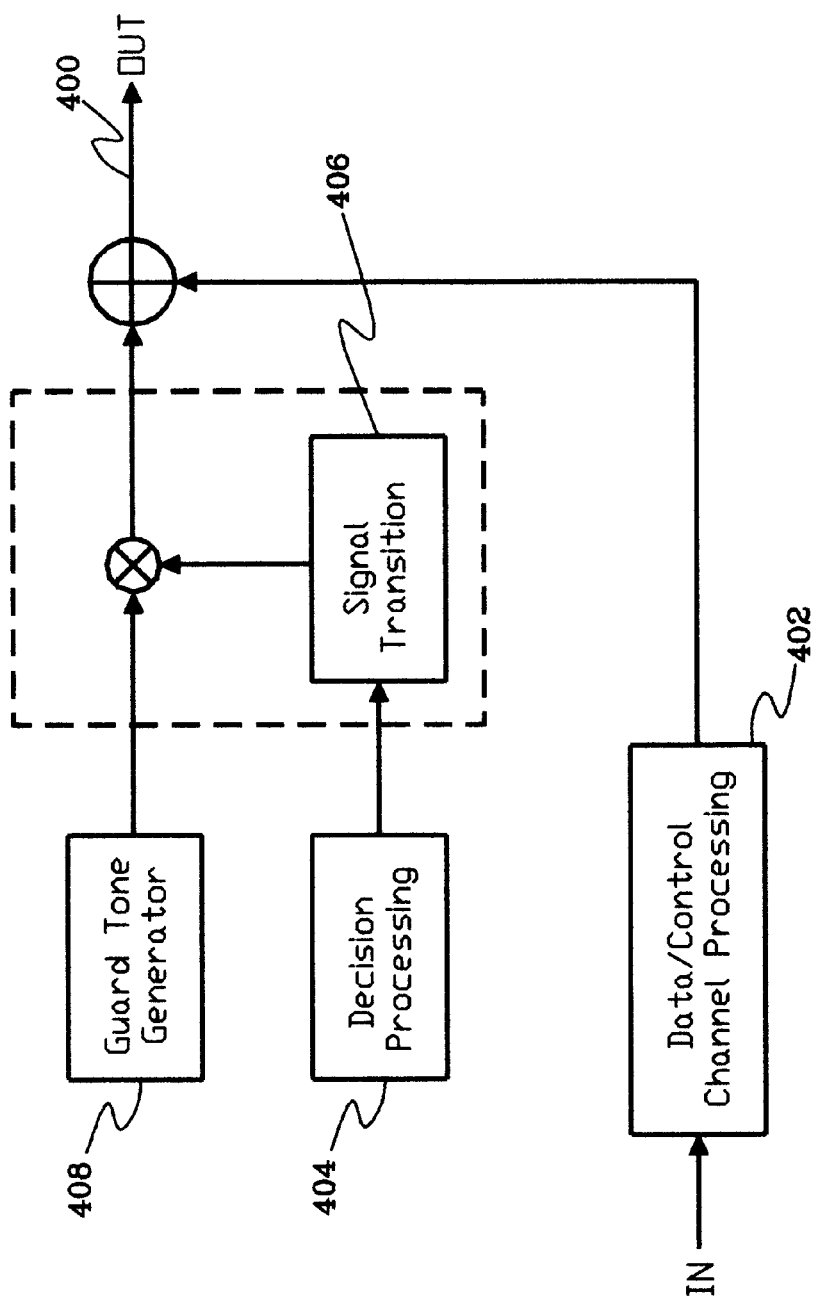
FIG. 4 is a block diagram of circuitry that creates communication signals that are transmitted across a communication link according to principles of the present invention.

FIG. 4 is a block diagram of circuitry that creates communication signals that are transmitted across a communication link 400 according to principles of the present invention. Existing communication devices typically communicate through components as illustrated by data/control channel processing 402. In other words, communication signals typically enter the data/control channel processing 402 and are output to the communication link 400. However, in one aspect of the present invention, circuitry for decision processing 404 is included to determine if communication characteristics on the communication link 400 can or should be changed and how the communication characteristics should be changed if they are to be changed. If the decision processing determines that signals need to be transferred, the signals are transmitted to a signal transition module 406 for further processing and modulated with a guard tone that is generated by a guard tone generator 408. The modulated signals are then combined with the signals form the data/control channel processing 402 and transmitted on the communication link 400. Of course, FIG. 4 is a generic diagram for numerous combinations of circuitry that perform the appropriate or desired functions of the communication devices of the present invention.

Figure 5:
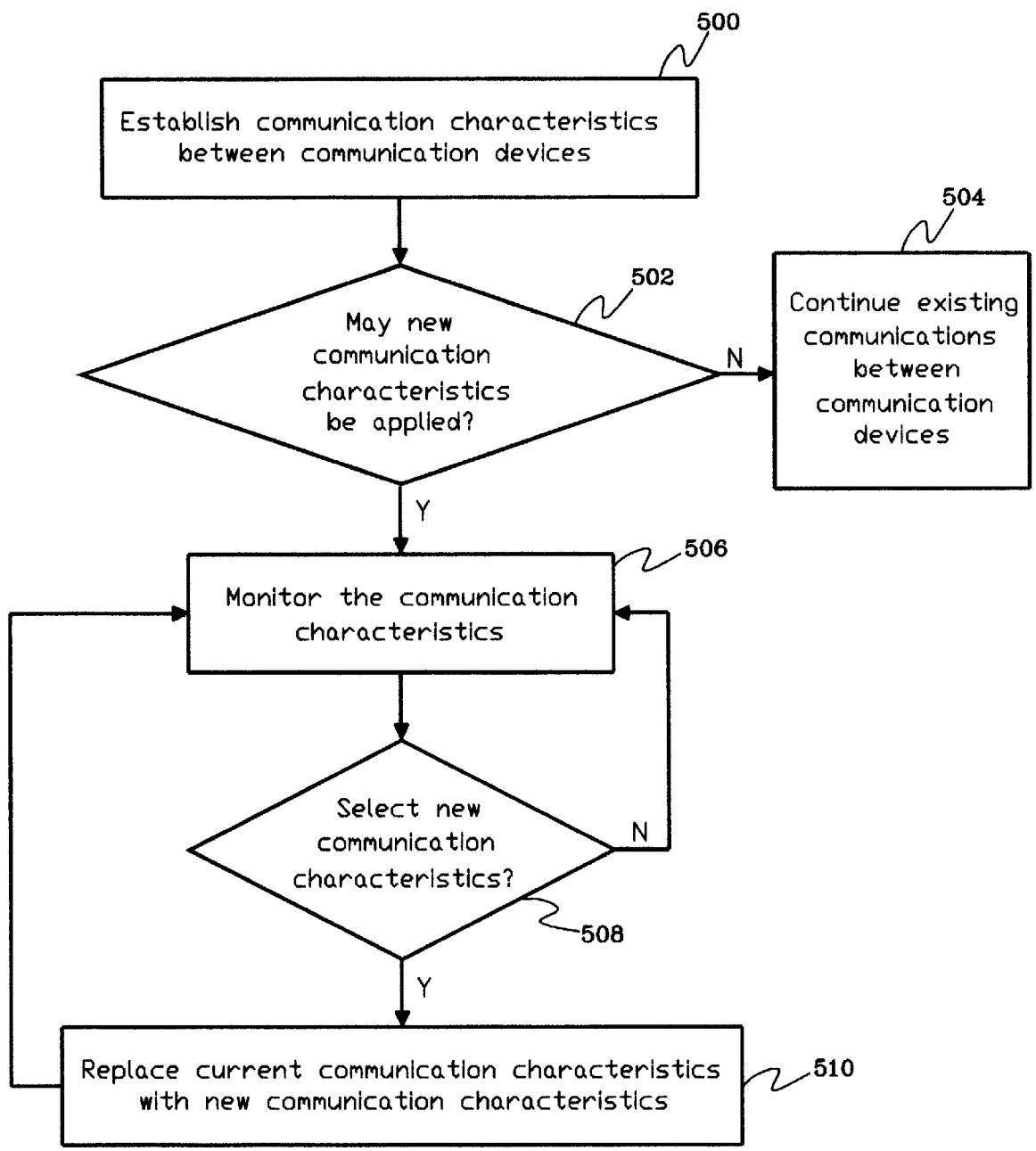
FIG. 5 is a flow diagram of an exemplary process for electronic communications across a communication link according to principles of the present invention.

FIG. 5 is a flow diagram of an exemplary process for electronic communications across a communication link according to principles of the present invention. Although variations of the communication process are contemplated, FIG. 5 shows communication characteristics being established between communication devices 500 such as the communication devices 200 and 202 or 300 and 302. In this embodiment, at least one of the communication devices then investigates to determine whether new communication characteristics may be applied 502. If no change in communication characteristics is possible, the communication devices continue existing communications between themselves 504.

On the other hand, if new communication characteristics may be applied, the existing communication characteristics are monitored 506. Upon monitoring the existing characteristics, at least one of the communication devices periodically analyzes whether to select new communication characteristics 508. If the decision is ever made to select new characteristics, the current communication characteristics are replaced with new communication characteristics 510. Of course, this process is not limited to the steps of FIG. 5 and may be modified in various manners to accomplish the principles according to the present invention, e.g., monitoring the characteristics 506 prior to determining whether the communication characteristics can be applied 502.

Figure 6A:
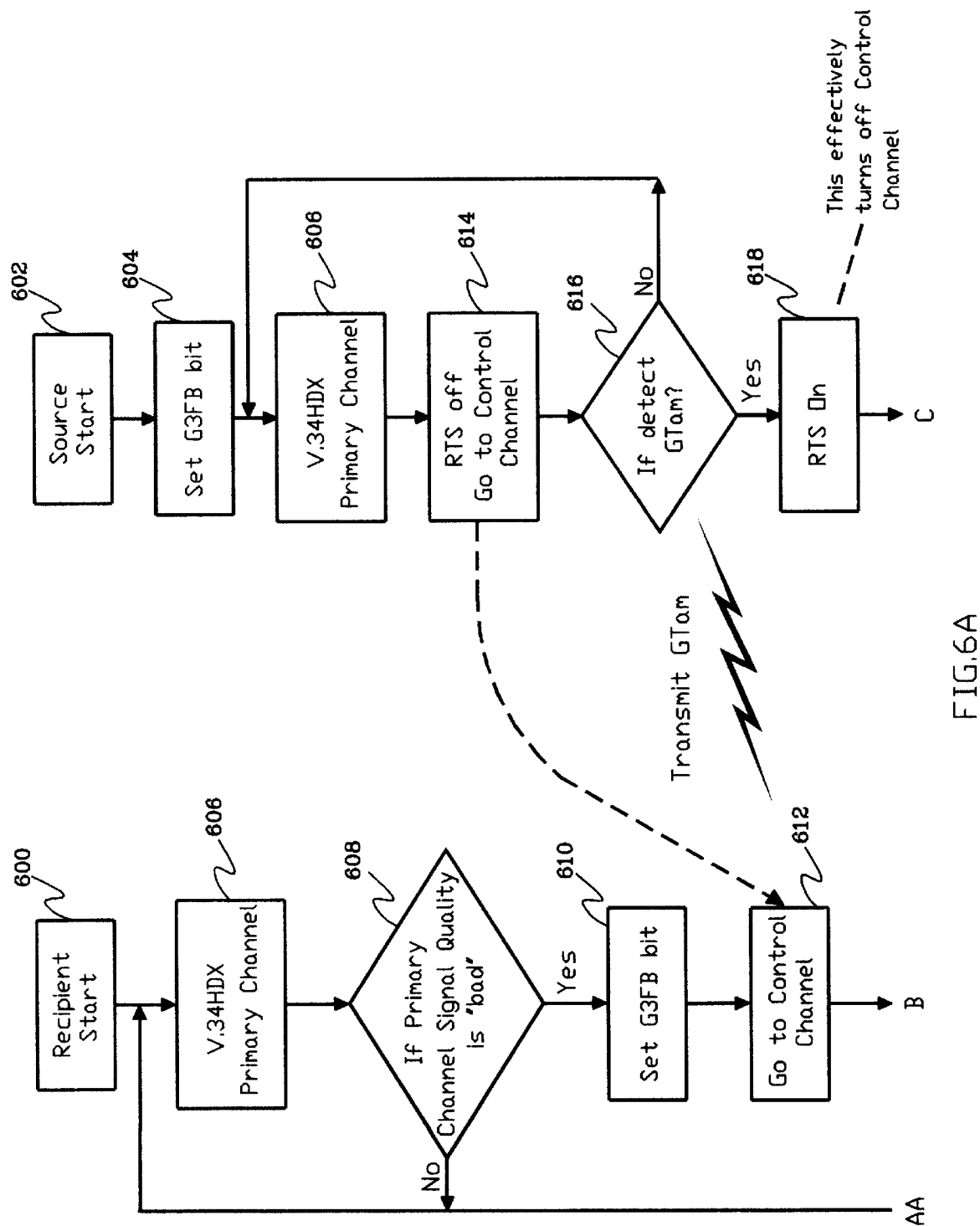
FIGS. 6A and 6B illustrate a flow diagram of an exemplary process for electronic communications across a communication link wherein late fallback procedures for falling back from V.34HDX to V.21 are shown.
Figure 6B:
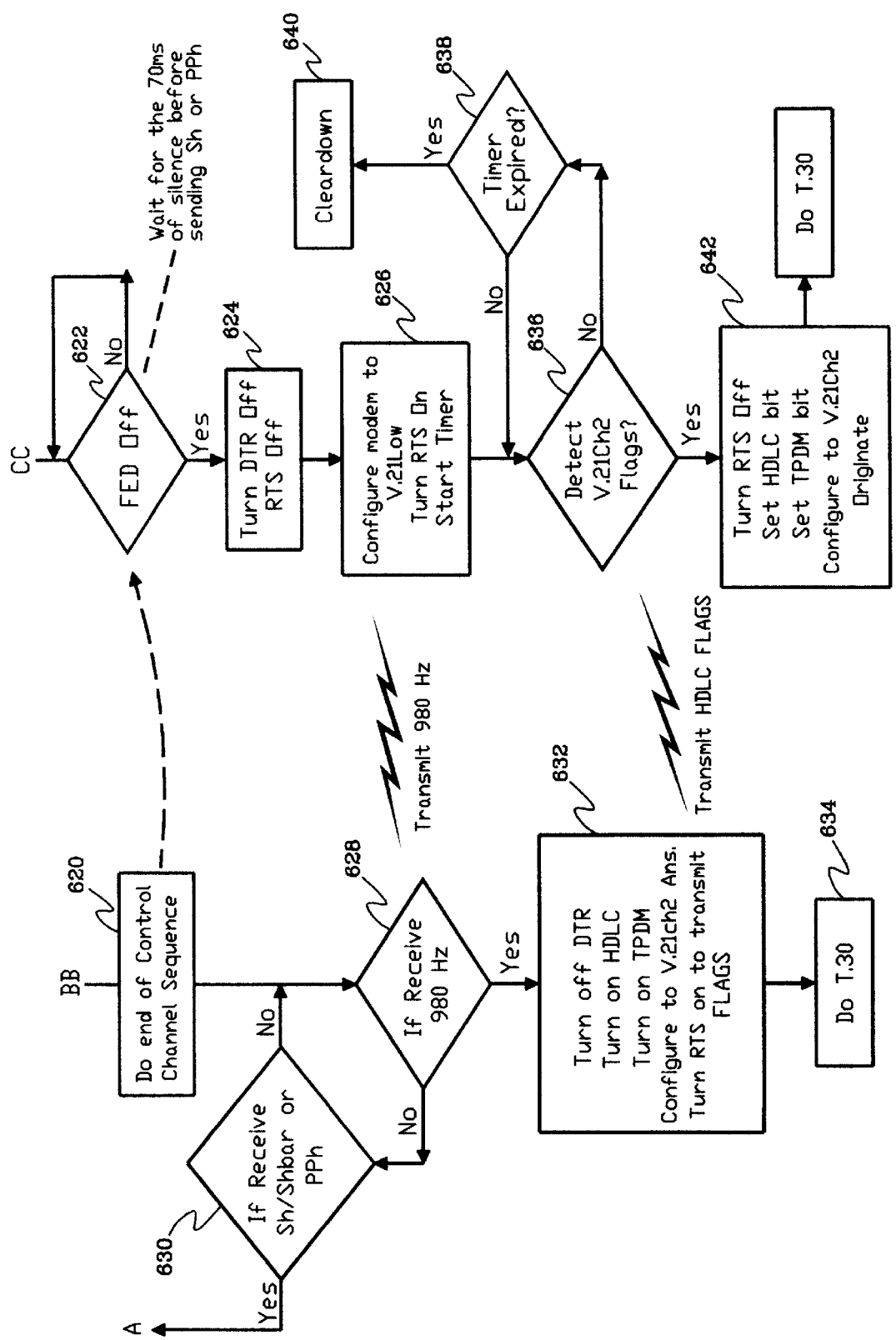

FIGS. 6A and 6B illustrate a flow diagram of an exemplary process for electronic communications across a communication link wherein late fallback procedures for falling back from V.34HDX to V.21 are shown. In FIG. 6A, corresponding flow charts for a source modem (calling modem) and a recipient modem (answering modem) begin with recipient start 600 and source start 602. After the source start 602, a G3FB bit (a control bit that enables V.34 HDX to fall back to Group 3 facsimile) is set 604 and both the source and the recipient enter a V.34HDX primary channel 606. The recipient enters a state where the primary channel signal quality is monitored 608 and remains in this state until the primary channel is determined to be 'bad', i.e., undesirable for communications. A signal quality is a quantity read from a data pump that indicates the quality of the communications and is related to the error rate performance of the data pump. At this point, the recipient sets a G3FB bit 610 and goes to a control channel 612 where a GTam signal is transmitted to the source.

The source periodically turns RTS ("request to send") off and goes to the control channel 614 to determine if a GTam signal has been transmitted from the recipient 616. If no GTam is detected, the source repeats the cycle of entering the V.34HDX primary channel 606, turning RTS off and going to the control channel 614 to monitor for the GTam signal 616. If a GTam signal is detected, RTS is turned on at the source 618 effectively turning off the control channel.

Turning now to FIG. 6B, the recipient performs an end of control channel sequence 620 after it has sent the GTam signal to the source. The source repeatedly checks to see if "FED off" 622 is affirmative so that the end of control channel sequence 620 can be properly received. FED is an acronym for "Fast Energy Detect" and indicates the presence of line signal energy. Once FED off 622 is affirmative, the source waits for approximately 70 ms of silence before sending Sh or PPh (sequence names used in ITU-T Recommendation V.34) and turning off DTR ("data terminal ready") and RTS 624. At this point, the source configures the modem to V.21Low (as defined in ITU-T Recommendation V.21), turns RTS on, transmits a 980 Hz signal to the recipient, and starts a timer 626.

Once the recipient has completed the end of control channel sequence 620 it inquires as to whether it has received the 980 Hz signal 628 from the source. If the 980 Hz signal 628 has not been received, the recipient checks to see if Sh/Shbar or PPh have been received 630 from is the source. This cycle continues at the recipient until either the 980 Hz signal is received or the Sh/Sbar, PPh signals are received.

In the FIG. 6 embodiment, if the 980 Hz signal is detected at the recipient, the recipient enters a state 632 in which DTR is turned off, the HDLC (link protocol) and TPDM (parallel data access mode) bits are set, the modem is configured to V.21Ch2 Ans. (or "V.21 high channel" as defined in ITU-T Recommendation V.21), and RTS is turned on to transmit FLAGS. The FLAGS are HDLC flags that are transmitted from the recipient to the source and the recipient enters a T.30 communication protocol 634. On the other hand, if the Sh/Sbar, PPh signals are received before the 980 Hz signal, the recipient returns to the V.34 HDX primary channel 606 where the primary channel EQM is again tested for quality 608.

The timer that was started at 626 of the source runs while the source checks to see if V.21Ch2 Flags have been detected 636. If no V.21Ch2 Flags are detected before the timer expires 638, the source performs a cleardown 640,i.e., a controlled disconnection of transmission. On the other hand, when the source detects V.21Ch2 Flags 636, the source enters a state 642 in which RTS is turned off, the HDLC and TPDM bits are set, and the source is configured to V.21Ch2. This reconfiguration allows the source to operate at the T.30 communication protocol 644 and completes the transition from V.34HDX to V.21Ch2. Of course, FIG. 6 is a specific embodiment of the principles according to the present invention and may be modified in various manners to accomplish the same "late fallback" results.

Figure 7A:
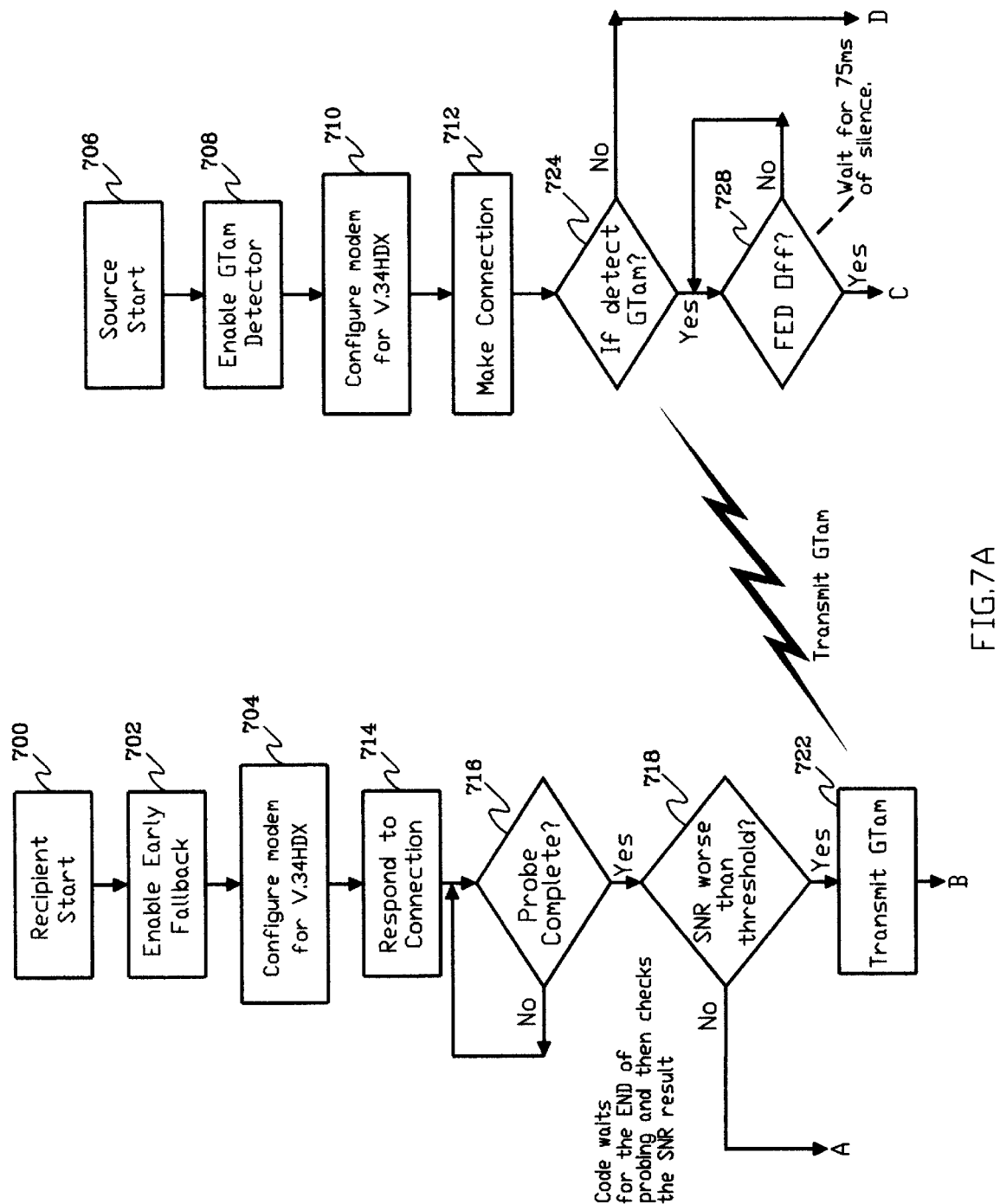
FIGS. 7A and 7B illustrate a flow diagram of an exemplary process for electronic communications across a communication link wherein early fallback procedures for falling back from V.34HDX to V.21 are shown.
Figure 7B:
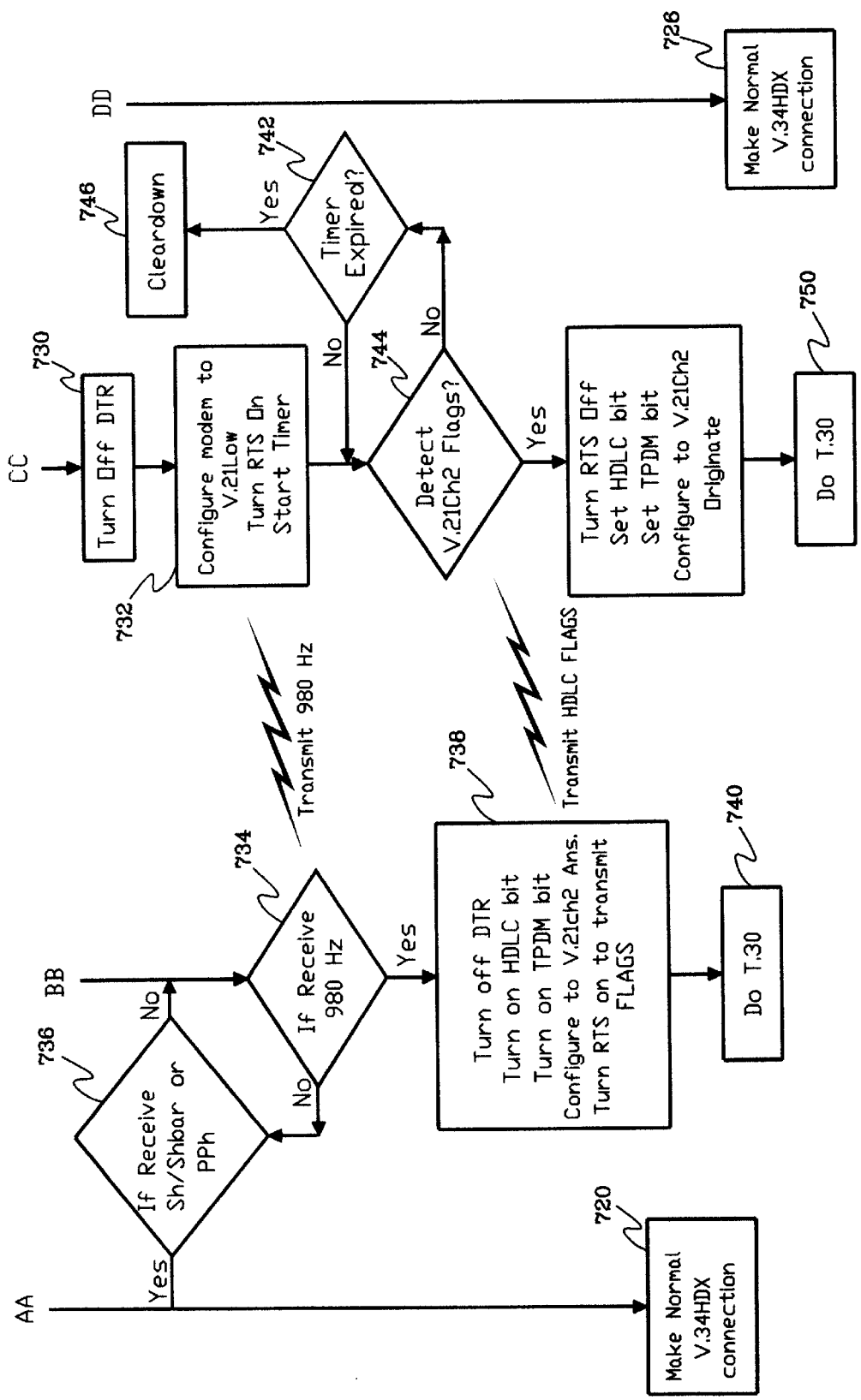

FIGS. 7A and 7B illustrate a flow diagram of an exemplary process for electronic communications across a communication link wherein "early fallback" procedures for falling back from V.34HDX to V.21 are shown. A recipient start 700 refers to an answering modem preparing to start communications with another modem. Specifically, an early fallback 702 is enabled at the recipient and the modem is configured for V.34HDX 704. A source start 706 refers to a source modem beginning to communicate by enabling a GTam detector 708 and configuring the modem for V.34HDX 710. At this point, the recipient requests to make a connection 712 and the recipient responds to the connection 714 and begins a probe to measure the quality of the connection. The "probe" is a sequence of tones that are transmitted by the calling modem to the answering modem. The amplitude and frequency characteristics of the tones are analyzed and used to determine the characteristics of the transmission media. Noise can be measured at frequencies not transmitted and then used to calculate the SNR of the transmission line. It is this quantity that can be used to determine if the quality of the V.34 connection is adequate. Once the probe completes 716, the SNR is checked to see if it is worse than a threshold 718. If the SNR is not worse than the threshold, a normal V.34HDX connection is made 720 (see FIG. 7B). On the other hand, if SNR is worse than the threshold, the recipient transmits GTam 722 to the source.

Returning to the source, a check is made to see if a GTam has been sent from the recipient 724. If not, the source proceeds to make a normal V.34HDX connection 726 (see FIG. 7B). If GTam is detected, the source waits until FED is off 728 and then waits for 75 ms of silence.

Turning to FIG. 7B, DTR is turned off 730 at the source and the modem is configured to V.21Low, RTS is turned on, and a timer is started 732. In addition, a 980 Hz signal is transmitted to the recipient. The recipient checks to see if either the 980 Hz signal 734 or Sh/Shbar or PPh 736 has been received. If Sh/Shbar or PPh is received prior to the 980 Hz signal, the recipient remains configured for a normal V.34HDX connection 720. On the other hand, if the 980 Hz signal is received first, the recipient enters a state 738 in which DTR is turned off, the HDLC and TPDM bits are turned on, the modem is configured to V.21ch2 Ans., and RTS is turned on to transmit HDLC Flags to the source modem before entering a T.30 mode 740.

Returning to the source, a cycle to check if the timer has expired 742 or V.21Ch2 Flags are detected 744 is repeated until one of the events occurs. If the timer expires prior to the detection of V.21Ch2 Flags, a cleardown state 746 is entered. On the other hand, if V.21Ch2 Flags are first detected, the source enters a state 748 in which RTS is turned off, HDLC and TPDM bits are set and the modem is configured to V.21Ch2 before a T.30 mode 750 is entered. Of course, like FIG. 6, FIG. 7 is a specific example of one method for carrying out the principles according to the present invention and should not be viewed as limiting the invention to, among other things, the specific order of steps, specific protocols, or frequencies for signals between source and recipient.

The above-listed sections and included information are not exhaustive and are only exemplary for telecommunication systems such as a modem. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A communication system comprising:
   a first modem;
   a second modem that establishes a communication link between the first modem and the second modem;
   the communication link having a first set of communication characteristics including a first communication channel or group of communication channels through which at least data is exchanged and a second communication channel through which no data is exchanged; and
   either the first modem or the second modem being configured to signal for a change, via the second communication channel, in the first set of communication characteristics, wherein the first modem is configured to signal for a change in the first set of communication characteristics via the second communication channel and the second modem is configured to dismiss the signal from the first modem on the second communication channel.

2. The communication system of claim 1 wherein the first modem is configured to recognize that the signal on the second communication channel has been dismissed by the second modem and the first modem refrains from further signaling to the second modem via the second communication channel.

3. A communication system comprising:
   a first modem;
   a second modem that establishes a communication link between the first modem and the second modem;
   the communication link having a first set of communication characteristics including a first communication channel or group of communication channels through which at least data is exchanged and a second communication channel through which no data is exchanged; and
   either the first modem or the second modem being configured to signal for a change, via the second communication channel, in the first set of communication characteristics, wherein the first modem is configured to signal for a change in the first set of communication characteristics via the second communication channel and the second modem is configured to recognize and respond to the signal, and wherein the first modem includes transition processing circuitry that monitors the first set of communication characteristics between the first and second modems, that indicates when communications via the communication link may be improved by shifting to a second set of communication characteristics on the communication link, and that enables a shift in the communication link to the second set of communication characteristics.

4. The communication system of claim 3 wherein the second set of communication characteristics includes at least a reduced data transmission rate.

5. The communication system of claim 3 wherein the second set of communication characteristics includes at least an increased data transmission rate.

6. The communication system of claim 3 wherein the second set of communication characteristics includes at least a data transmission rate that is similar to a data transmission rate of the first set of communication characteristics.

7. A method for a communication system having a communication link between a first communication device and a second communication device to inquire whether a first set of communication characteristics in the communication link may be modified, the method comprising:
   establishing at least first and second communication channels across the communication link, the first communication channel exchanging at least data according to the first set of communication characteristics, the second communication channel exchanging no data; and
   inquiring, by the first communication device across the second communication channel, whether the second communication device recognizes communications across the second communication channel.

8. The method of claim 7 wherein said inquiring whether the second communication device recognizes communications across the second communication channel comprises passing communication signals across the second communication channel in such manner that the communication signals do not interfere with communications on the first communication channel.

9. The method of claim 7 further comprising determining, by the first communication device, that communication signals are not recognized across the second communication channel by the second communication device.

10. The method of claim 9 further comprising discontinuing further inquiries across the second communication channel from the first communication device.

11. The method of claim 7 further comprising acknowledging, by the second communication device across the second communication channel, that communication signals are recognized across the second communication channel.

12. The method of claim 11 further comprising monitoring the first communication channel to analyze whether the first set of communication characteristics of the first communication channel should be modified.

13. The method of claim 12 further comprising determining that the first set of communication characteristics of the first communication channel should be modified and a new set of communication characteristics should be established;

indicating, across the second communication channel, that the first set of communication characteristics should be replaced with the new set of communication characteristics; and replacing the first set of communication characteristics with the new set of communication characteristics without interfering with communications between the first and second communication devices.

14. A communication system comprising:

a source communication device;

a destination communication device;

a communication link having a first set of communication characteristics for electronic communications between the source communication device and the destination communication device;

the source communication device including circuitry that generates a request signal to establish at least one communication channel with the destination communication device across the communication link;

the destination communication device including circuitry that receives and acknowledges the request signal from the source communication device and that completes establishment of the at least one communication channel; and the destination communication device including an indicator that indicates to the source communication device that the first set of communication characteristics in the communication link should be modified and a second set of communication characteristics should be established.

15. The communication system of claim 14 wherein the indicator of the destination communication device comprises circuitry that generates an indication signal that is transparent to data communications across the communication link.

16. The communication system of claim 14 wherein the source communication device includes additional circuitry that acknowledges receipt of an indication signal from the destination communication device, the indication signal being received across a second communication channel that does not pass data between the source and destination communication devices.

17. The communication system of claim 14 wherein the indicator of the destination communication device comprises circuitry that amplitude modulates a guard tone with a second frequency and depth that is dependent upon requirements of the first set of communication characteristics on the communication link.

18. The communication system of claim 14 wherein the indicator of the destination communication device indicates to the source communication device that data communications across the communications link that utilize the first set of communication characteristics could be improved by shifting to a second set of communication characteristics.

* * * * *